US012595850B2

(12) United States Patent
Kojima et al.

(10) Patent No.: US 12,595,850 B2
(45) Date of Patent: Apr. 7, 2026

(54) SEAL MEMBER FOR ROLLING BEARING

(71) Applicant: NAKANISHI METAL WORKS CO., LTD., Osaka (JP)

(72) Inventors: Yasuhiko Kojima, Osaka (JP); Machi Sadamori, Osaka (JP)

(73) Assignee: NAKANISHI METAL WORKS CO., LTD., Osaka (JP)

( * ) Notice: Subject to any disclaimer, the term of this patent is extended or adjusted under 35 U.S.C. 154(b) by 0 days.

(21) Appl. No.: 18/699,467

(22) PCT Filed: Oct. 24, 2022

(86) PCT No.: PCT/JP2022/039589
§ 371 (c)(1),
(2) Date: Apr. 8, 2024

(87) PCT Pub. No.: WO2023/074643
PCT Pub. Date: May 4, 2023

(65) Prior Publication Data
US 2024/0410468 A1 Dec. 12, 2024

(30) Foreign Application Priority Data

Oct. 26, 2021 (JP) ................................. 2021-174698

(51) Int. Cl.
*F16J 15/3284* (2016.01)
*F16C 33/78* (2006.01)

(52) U.S. Cl.
CPC ....... *F16J 15/3284* (2013.01); *F16C 33/7816* (2013.01); *F16C 33/784* (2013.01)

(58) Field of Classification Search
CPC ................ F16C 33/7816; F16C 33/782; F16C 33/7823; F16C 33/7853; F16C 33/7856; F16J 15/3284
See application file for complete search history.

(56) References Cited

U.S. PATENT DOCUMENTS

| | | | | |
|---|---|---|---|---|
| 3,130,976 | A * | 4/1964 | Niswander, V | ......... F16C 33/74 384/138 |
| 5,852,093 | A * | 12/1998 | Aimura | ................ F16J 15/3208 524/433 |
| 7,053,028 | B2 * | 5/2006 | Kawamura | ......... F16C 33/6633 508/555 |
| 7,229,077 | B2 * | 6/2007 | Keshavan | ................ F16J 15/32 277/540 |

(Continued)

FOREIGN PATENT DOCUMENTS

| | | |
|---|---|---|
| JP | S57-007908 B2 | 2/1982 |
| JP | S60-139936 U | 9/1985 |

(Continued)

*Primary Examiner* — Nicholas L Foster
(74) *Attorney, Agent, or Firm* — Kratz, Quintos & Hanson, LLP

(57) ABSTRACT

Provided is a seal member for rolling bearing, which includes a seal body, and a coating layer that contains an antiozonant and silicone oil, and is formed on a surface of the seal body. The seal member for rolling bearing can be produced by applying on a surface of the seal body, a coating composition containing 10 to 30% by weight of an antiozonant and 3 to 10% by weight of silicone oil, the antiozonant and the silicone oil being dispersed in a solvent.

6 Claims, 3 Drawing Sheets

(56)                References Cited

U.S. PATENT DOCUMENTS

| | | | | | |
|---|---|---|---|---|---|
| 8,075,000 | B2 * | 12/2011 | James | .................... | F16J 15/166 |
| | | | | | 277/589 |
| 9,488,255 | B2 * | 11/2016 | Ishizaki | .............. | F16H 25/2418 |
| 2003/0069147 | A1 * | 4/2003 | Kawamura | .......... | C10M 169/00 |
| | | | | | 508/555 |
| 2004/0251052 | A1 * | 12/2004 | Keshavan | .............. | F16J 15/104 |
| | | | | | 428/66.6 |
| 2006/0214379 | A1 * | 9/2006 | James | ................. | F16J 15/3208 |
| | | | | | 277/559 |
| 2015/0114156 | A1 * | 4/2015 | Ishizaki | .............. | F16H 25/2418 |
| | | | | | 74/424.82 |
| 2019/0219101 | A1 * | 7/2019 | Dei | ....................... | F16C 29/086 |

FOREIGN PATENT DOCUMENTS

| | | | |
|---|---|---|---|
| JP | H02-041331 | A | 2/1990 |
| JP | 2011-140976 | A | 7/2011 |

* cited by examiner

SEAL MEMBER FOR ROLLING BEARING

TECHNICAL FIELD

The present invention relates to a seal member for rolling bearing and a method for producing the same.

BACKGROUND ART

In bearings used in automobile parts, such as suspension parts and auxiliary equipment around the engine (alternator, air conditioner, etc.), a seal member in which the surface of a ring-like core metal is covered with a rubber molded product is disposed to prevent entry of muddy water, dust, and the like in consideration of leakage of grease, rainfall, or rough roads. The physical properties of the rubber molded product constituting the seal member are lowered over long-time use. This causes hardening and cracking to occur, and sometimes causes the rubber molded product to become soft and sticky. This phenomenon is called deterioration (also called aging), and in general, deterioration is often accelerated by oxidation of rubber due to reaction with oxygen and ozone in atmospheric air. For preventing deterioration of a seal member, techniques of preventing ozone deterioration are known, which include blending an antiozonant (also referred to as antioxidant agent) at the time of kneading rubber before vulcanization, or dipping a vulcanized rubber molded product into a solution containing an antiozonant or applying the solution to the rubber molded product, thereby making the antiozonant disperse and permeate in the rubber (Patent Literatures 1 to 4).

CITATION LIST

Patent Literature

[PTL 1] Japanese Unexamined Patent Application Publication No. 2011-140976
[PTL 2] Japanese Utility Model Application Publication No. S60-139936
[PTL 3] Japanese Unexamined Patent Application Publication No. H2-41331
[PTL 4] Japanese Examined Patent Application Publication No. S57-7908

SUMMARY OF THE INVENTION

Problems to be Solved by the Invention

However, since antiozonants are reactive chemicals, kneading of an antiozonant into a rubber material may accelerate vulcanization of the rubber material to reduce the heat resistance, and transfer of the antiozonant to the surface of the rubber may hinder the adhesion of the rubber material with the core metal.

In incorporating seal members for rolling bearing into a bearing, the seal members are aligned in a magazine and supplied one by one by a pusher. At this time, the parts covered with rubber may stick to each other to cause the problem of supply failure. For this reason, it is also required that the seal members are not likely to stick to each other.

Patent Literature 4 describes further containing rubber and graphite in a solution containing an antiozonant and applying the solution to the rubber material, followed by cross-linking to thereby reduce the abrasion coefficient. However, this case still has a concern of the problem of sticking between seal members as is the case with the above.

Therefore, an object of the present invention is to provide a seal member for rolling bearing that maintains heat resistance while sufficiently exhibiting the function of the antiozonant, has good adhesivity with a core metal, and is not likely to cause sticking between seal members when manufactured into a product, and a method for producing the same.

Solution to the Problems

The present inventors made diligent studies for solving the aforementioned problems. Through the studies, the present inventors found that it is possible to prepare a seal member for rolling bearing that maintains heat resistance while sufficiently exhibiting the function of the antiozonant, has good adhesivity with a core metal, and is not likely to cause sticking between seal members when manufactured into a product, by forming a coating layer containing an antiozonant and silicone oil on the surface of a seal body, and accomplished the present invention.

The scope of the present invention relates to:

[1] a seal member for rolling bearing, including: a seal body; and a coating layer that contains an antiozonant and silicone oil and is formed on a surface of the seal body,

[2] the seal member for rolling bearing according to the above [1], in which in the coating layer, a content of the antiozonant is 50 to 92% by weight and a content of the silicone oil is 8 to 50% by weight,

[3] the seal member for rolling bearing according to the above [1] or [2], in which the seal body contains a dienic rubber composition,

[4] a method for producing a seal member for rolling bearing, including a step of applying to a surface of a seal body, a coating composition containing 10 to 30% by weight of an antiozonant and 3 to 10% by weight of silicone oil, the antiozonant and the silicone oil being dispersed in a solvent,

[5] the method for producing a seal member for rolling bearing according to the above [4], further including a step of vaporizing the solvent in the coating composition to form a coating layer, and

[6] the method for producing a seal member for rolling bearing according to the above [4] or [5], in which the seal body includes a dienic rubber composition.

Advantageous Effects of the Invention

The seal member for rolling bearing of the present invention is not likely to cause the problems such as reduction in heat resistance and reduction in adhesivity with a core metal while fully exhibiting the function of preventing ozone deterioration. Therefore, the seal member for rolling bearing is disposed in bearings to be used in automobile parts, such as suspension parts and auxiliary equipment around the engine (alternator, air conditioner, etc.), thereby maintaining the reliability of the rolling bearing even when the automobile is used under severe environments.

Also, since the seal member for rolling bearing of the present invention is excellent in preventing sticking between seal members for incorporation into a rolling bearing, it is possible to produce rolling bearings with high efficiency.

BRIEF DESCRIPTION OF THE DRAWINGS

FIG. 1 relates to explanatory diagrams showing a configuration of a rolling bearing in which a seal member for rolling bearing according to an embodiment of the present invention is attached to auxiliary equipment around an engine of an automobile.

DESCRIPTION OF EMBODIMENTS

Hereinafter, the present invention will be described more specifically. The present invention is not limited to the forms shown in the accompanying drawings, but includes all embodiments that satisfy the requirements set forth in the claims.

[Configuration Example of Rolling Bearing]

Figure 1A:
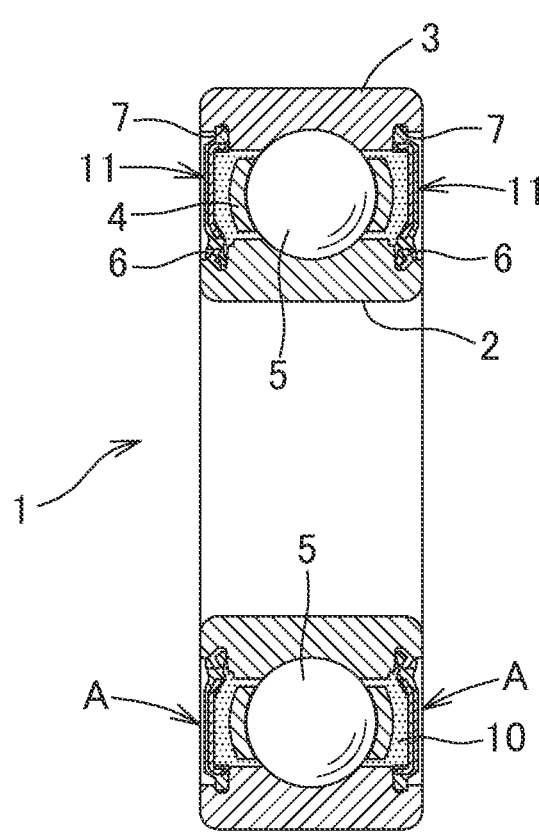
FIG. 1A is a sectional view of the whole of the rolling bearing and FIG. 1B is an enlarged sectional view of an essential part.
Figure 1B:
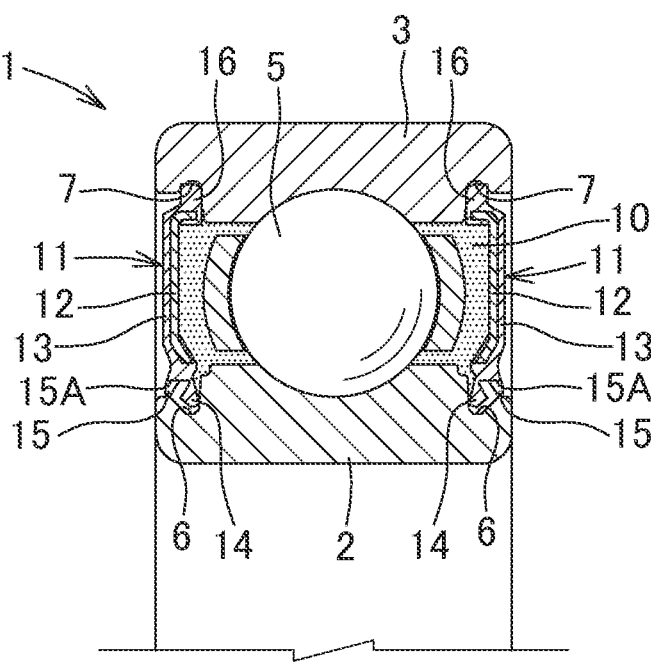

FIG. 1 relates to explanatory diagrams showing a configuration of a rolling bearing in which a seal member for rolling bearing according to an embodiment of the present invention is attached to auxiliary equipment around an engine of an automobile, and show a deep groove ball bearing as an example. FIG. 1A is a sectional view of the whole of a rolling bearing 1, and FIG. 1B is an enlarged sectional view of an essential part.

In this description, a direction of the rotation axis of a radially inner member, which is the rotation side member with a seal for rotation being installed, is referred to as "axial direction", and a direction orthogonal to the axial direction is referred to as "radial direction".

Also, in a bearing device for supporting a wheel of an automobile, a direction from the body of an automobile toward a wheel is referred to as "outward", and the opposite direction is referred to as "inward".

In FIG. 1, the rolling bearing 1 has an inner ring 2 and an outer ring 3 that rotate relative to each other via rolling elements 5 held by a retainer 4. Between the inner ring 2 and the outer ring 3, grease 10 is sealed as a lubricant. On the left and right in the bearing width direction of the rolling elements 5, a sealing device is provided which is configured by a seal member 11 having a generally annular shape in the front view, and a circumferential groove 6 formed on the outer peripheral face of the inner ring 2. The sealing device closes an annular opening A between the inner ring 2 and the outer ring 3. The seal member 11 includes a seal body, and a coating layer that contains an antiozonant and silicone oil and is formed on the surface of the seal body. The seal member 11 is attached to at least either one of annular openings A, A on the left and right in the bearing width direction between the inner ring 2 and the outer ring 3 of the rolling bearing 1. (The seal member may not necessarily be of a double shield form that seals both sides of the rolling bearing 1 as shown in FIG. 1, but may be of a single shield form that seals only one side of the rolling bearing 1 depending on the use location.) As shown in FIG. 1B, the seal member 11 has such a structure that an outer peripheral part and an inner peripheral part of an annular core metal 12 made of an iron steel sheet (SPCC, SECC, etc.) are continuously covered with an elastic body 13 such as synthetic rubber by vulcanizing adhesion, and the distal end part of the elastic body 13 has a lip structure. The lip structure includes a main lip 14 on the inner side and a dust lip 15 on the outer side of the inner peripheral side (inner ring 2 side), and an outer diameter lip 16 on the outer peripheral side (outer ring 3 side).

The main lip 14 is provided for preventing the grease 10 filled inside the rolling bearing 1 from leaking, and preventing foreign matter from entering from outside. The dust lip 15 is provided for reducing entry of foreign matter from outside by the labyrinth seal effect. In addition, the outer diameter lip 16 is fitted into an outer ring circumferential groove 7 formed on the inner peripheral face of the outer ring 3 to position and fix the seal member 11 with respect to the bearing 1, and prevents foreign matter from entering from the outer diameter part of the seal member 11. Further, in the dust lip 15, a groove 15A is formed, and the seal member 11 also has the function of facilitating discharge of water, muddy water, or the like, which has entered between the dust lip 15 and the main lip 14. In FIG. 1, a contact type seal member in which the main lip 14 comes into slide contact with the inner ring circumferential groove 6 is described. Here, the present invention is also applicable to a noncontact type seal member in which a labyrinth gap is provided to inhibit contact with the inner ring circumferential groove 6.

Figure 2:
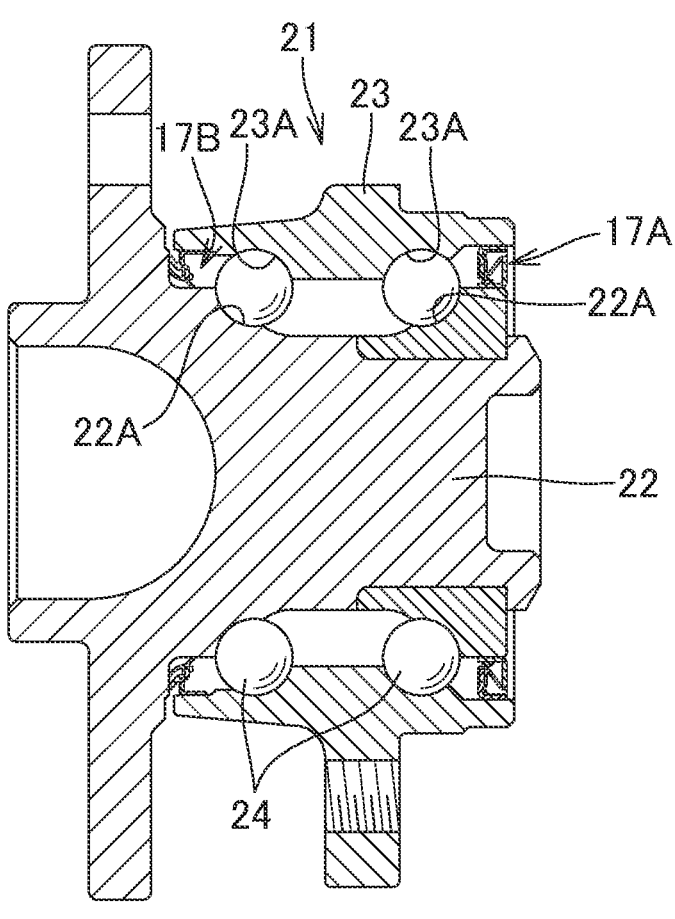
FIG. 2 is a schematic longitudinal view with a partially sectional view, which shows an example in which a seal member for rolling bearing according to the embodiment of the present invention is used in a bearing device for supporting a wheel of an automobile.

The schematic longitudinal view with a partially sectional view of FIG. 2 shows an example in which seals 17A, 17B for rolling bearing according to the embodiment of the present invention is used in a bearing device 21 for supporting a wheel of an automobile.

The bearing device 21 includes a bearing having: an inner ring 22 that has, on the outer peripheral face thereof, an inner ring raceway surface 22A and rotates together with a wheel; an outer ring 23 that has, on the inner peripheral face thereof, an outer ring raceway surface 23A and is integral with the vehicle body; balls 24, 24 that are rolling elements rolling between the inner ring raceway surface 22A and the outer ring raceway surface 23A; and the like.

The bearing device 21 further includes the seals 17A, 17B for rotation that prevent muddy water or the like from entering, and prevent leakage of lubricating grease at the inward end and the outward end (inward than the inward balls 24, and outward than the outward balls 24) between the inner ring 22 and the outer ring 23.

[Structure Example of Seal Member for Rolling Bearing]

(Inward Seal Member for Rolling Bearing)

Figure 3:
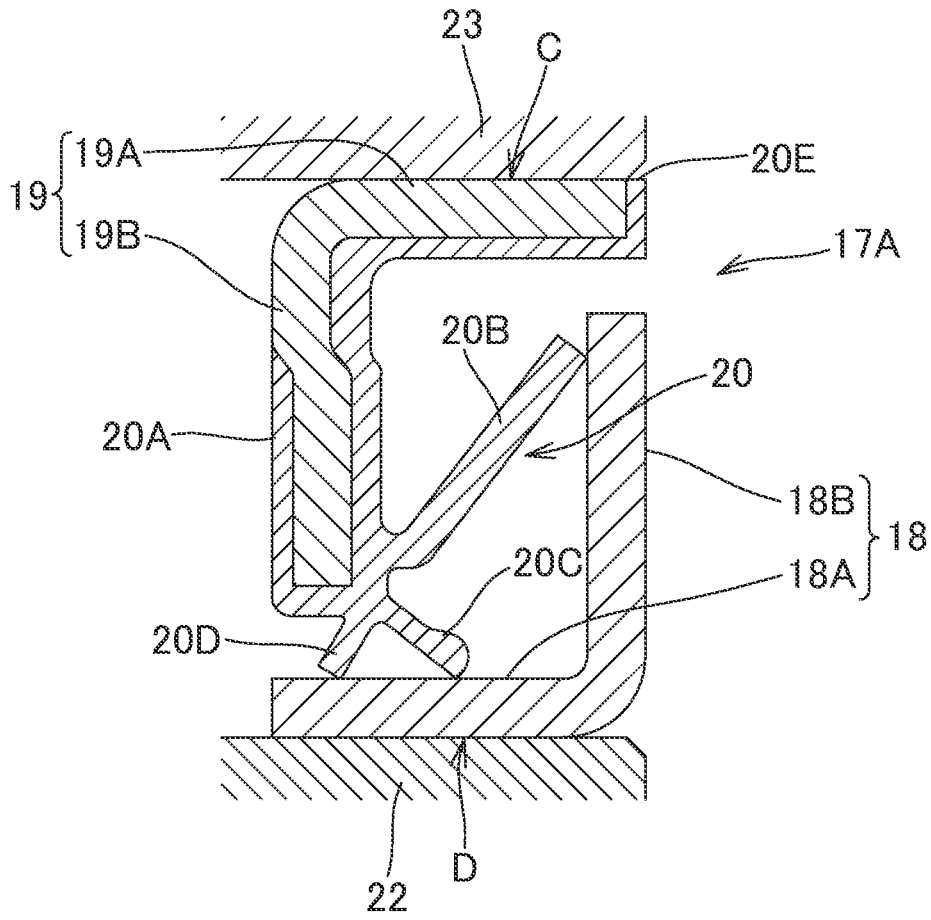
FIG. 3 is an enlarged longitudinal sectional view of an essential part of an inward seal for rotation.

As shown in the enlarged longitudinal sectional view of FIG. 3, the inward seal for rolling bearing 17A according to the embodiment of the present invention includes a slinger 18 produced by press working from a stainless steel sheet, a core metal 19 produced by press working from an iron steel sheet (SPCC, SECC, etc.), and a seal member for rolling bearing 20 integrated with the core metal 19. The seal member 20 includes a seal body, and a coating layer containing an antiozonant and silicone oil formed on the surface of the seal body.

The seal member 20 includes a base portion 20A joined with the core metal 19, and seal lip portions 20B, 20C, 20D extending from the base portion 20A. The distal end of the seal lip portion 20B is brought into slide contact with the inner surface (surface of the outward side) of a flange 18B of the slinger 18, and the distal ends of the seal lip portions 20C, 20D are brought into slide contact with the outer peripheral surface of a sleeve 18A of the slinger 18. Further, the base portion 20A has an outer peripheral seal part 20E that extends outward in the circumferential direction to cover a core metal cylinder 19A.

The slinger 18 includes the sleeve 18A having a cylindrical shape, and the flange 18B that extends outward in the radial direction from one end in the axial direction of the sleeve 18A, and the sleeve 18A made of stainless steel is attached to the inner ring 22 which is a radially inner member made of iron steel.

The core metal 19 includes the core metal cylinder 19A having a cylindrical shape, and a core metal flange 19B that extends inward in the radial direction from one end in the axial direction of the core metal cylinder 19A. The core metal cylinder 19A made of an iron steel sheet (SPCC, SECC, etc.) is attached to the outer ring 23 which is a radially outer member made of iron steel.

By press-fitting the core metal cylinder 19A of the core metal 19 made of an iron steel sheet (SPCC, SECC, etc.) into the outer ring 23 that is a radially outer member made of iron steel, the core metal 19 and the seal member 20 are fixed to the outer ring 23.

Here, a fitting part C between metals of the core metal 19 and the outer ring 23 is sealed by the outer peripheral seal part 20E.

By press-fitting the sleeve 18A of the slinger 18 made of stainless steel into the inner ring 22 which is a radially inner member made of iron steel, the slinger 18 is fixed to the inner ring 22.

[Seal Member for Rolling Bearing]

According to the seal member for rolling bearing of the present invention (hereinafter, also referred to as a seal member of the present invention), the coating layer containing an antiozonant and silicone oil is formed on the surface of the seal body. The surface of the seal body is coated with the antiozonant in this manner, thereby allowing the antiozonant to sufficiently exhibit the ozone deterioration preventive function. In addition, the seal body does not contain the antiozonant, so that reduction in keeping of heat resistance of the seal body and reduction in adhesivity of the seal body with the core metal are less likely to occur.

The seal body is formed of a rubber composition, and specifically is a rubber molded body that has underwent molding such as sheet molding after vulcanization of the rubber composition according to a known technique.

Examples of the rubber composition include dienic rubber compositions, natural rubber (NR) compositions, and isoprene rubber (IR) compositions. From the viewpoints of oil resistance and heat resistance, dienic rubber compositions such as acrylonitrile butadiene rubber (NBR) are preferred.

The coating layer formed on the surface of the seal body is prepared by vaporizing the solvent from the coating composition, and the content in this context refers to a ratio of the antiozonant and the silicone oil.

Examples of the antiozonant contained in the coating layer include naphthylamine-based antiozonant, diphenylamine-based antiozonant, p-phenylenediamine-based antiozonant, quinoline-based antiozonant, hydroquinone derivative-based antiozonant, mono-, bis-, tris-, polyphenol-based antiozonant, thiobisphenol-based antiozonant, hindered phenol-based antiozonant, phosphite-based antiozonant, imidazole-based antiozonant, nickel dithiocarbamate-based antiozonant, and phosphoric acid-based antiozonant.

Examples of p-phenylenediamine-based antiozonants include N-phenyl-N'-isopropyl-p-phenylenediamine and N-(1,3-dimethylbutyl)-N'-phenyl-1,4-phenylenediamine.

These can be used alone or in combination of two or more.

The content of the antiozonant in the coating layer is preferably 50 to 92% by weight from the viewpoint of effective exhibit of the effect of the antiozonant.

The coating layer in the present invention is prepared by vaporizing the solvent from the coating composition. Therefore, the content in the coating layer refers to a ratio of the antiozonant and the silicone oil contained in the coating layer.

Examples of the silicone oil contained in the coating layer include dimethyl silicone oil, methylphenyl silicone oil, methyl hydrogen silicone oil, and various other modified silicone oils.

The content of silicone oil in the coating layer is preferably 8 to 50% by weight.

The coating layer may contain any ingredient such as an oxidative deterioration inhibitor as long as the effect of the present invention is not impaired.

Since the silicone oil contained in the coating layer is a non-volatile liquid, and is a liquid that hardly volatilizes at actual usage temperatures, the coating layer is a liquid having a predetermined viscosity. The thickness of the coating layer may be within such a range that the effect of the antiozonant is easily exhibited and the rubber elasticity and followability of the seal member are good.

The seal member of the present invention can be produced by, for example, applying to the surface of the seal body, a coating composition containing 10 to 30% by weight of the antiozonant and 3 to 10% by weight of the silicone oil, the antiozonant and the silicone oil being dispersed in a solvent.

Examples of the solvent include, but are not particularly limited to, toluene, xylene, and acetone.

Examples of the application method include, but are not particularly limited to, dipping, spraying, brush application, and dispenser application.

In addition, by vaporizing the solvent in the coating layer after application of the coating composition, it is possible to produce a seal member that can be inserted into a bearing race.

Examples of the vaporization method include, but are not particularly limited to, a method of drying in an oven, and hot air drying.

The seal member of the present invention obtained in the manner as described above is less likely to cause problems such as reduction in heat resistance and reduction in adhesivity with a core metal while fully exhibiting the ozone deterioration preventing function, and has an advantage of excellent seal insertability for incorporation into the rolling bearing.

EXAMPLES

Next, the present invention will be described by way of Examples, but the present invention is not limited to these examples in any way.

Examples 1 to 6

A coating composition in which the mixing amounts of silicone oil (dimethyl silicone oil), an antiozonant (N-phenyl-N'-isopropyl-p-phenylenediamine, N-(1,3-dimethylbutyl)-N'-phenyl-1,4-phenylenediamine), and toluene were set as shown in Table 1 was prepared.

Then, for a seal body of an NBR material having been preliminarily subjected to a predetermined vulcanization molding, a coating composition obtained in Examples 1 to 6 was applied by dipping, and dried for 10 minutes in an oven at 120° C. to vaporize the solvent, and thus a seal member having, on the entire surface thereof, a coating layer containing silicone oil and an antiozonant was prepared.

The seal member was used as a test sample in the following test examples.

Comparative Example 1

A seal body of an NBR material without the coating layer was used as a test sample.

Comparative Example 2

As a test sample, a seal member having a coating on its entire surface was prepared using a commercially available water-soluble silicone emulsion (produced by Lion Specialty Chemicals Co., Ltd.) instead of the coating composition.

Comparative Examples 3 and 4

A coating composition was prepared in the same manner as in Example 1, except that the amounts of the silicone oil, the antiozonant, toluene, and the water-soluble silicone emulsion were as shown in Table 1.

Next, using the obtained coating composition, a seal member having, on its entire surface, a coating layer containing the silicone oil and the antiozonant was produced in the same manner as in Example 1, and used as a test sample.

Test Example 1: Stickiness Test

Twenty test samples were stacked and left to stand at 40° C. for 21 hours under application of a pressure (approxi-

8 x: five or more test samples showed a release force of 80 gf or more.

Test Example 2: Ozone Deterioration Test

In accordance with JIS D 0205 (1976): Test Method of Weatherability for Automotive Parts, test samples were left to stand for 6 hours in an environment at a temperature of 60±2° C. and an ozone concentration of 200±5 ppm, and then whether cracking occurred was visually examined. The result is shown in Table 1.

In addition, in Example 5, test samples were left to stand for 48 hours in an environment at a temperature of 25° C., an ozone concentration of 200±5 pphm, an ozone flow rate of 30 mm/s, and an elongation of 5%, and then presence/absence of cracking was visually examined, in accordance with ISO 1431-1A (2012): Identification of Resistance to Cracking under Ozone Exposure. The result is shown in Table 1.

Evaluation Criteria:

o: no cracking observed x: cracking observed

Test Example 3: Rust-Proof Test

An annular seal was prepared using an SPCC steel sheet as a core metal. Then, the seal having been subjected to the treatment was left to stand for 24 hours in an atmosphere of 80° C. and 90% (RH). After 24 hours, a treatment in which no rust was visually confirmed in a part where the steel sheet of the seal is exposed was marked "o", and a treatment in which rust was confirmed was marked "x". The result is shown in Table 1.

TABLE 1

Figure 4:
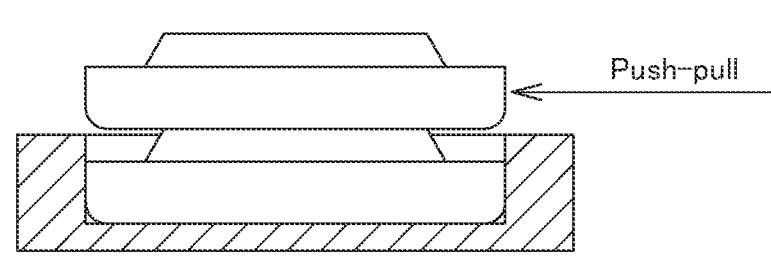
FIG. 4 is an explanatory diagram showing a method of conducting a stickiness test.

|  |  | Example 1 | Example 2 | Example 3 | Example 4 | Example 5 | Example 6 | Comparative Example 1 (without coating) | Comparative Example 2 (aqueous coating) | Comparative Example 3 | Comparative Example 4 |
|---|---|---|---|---|---|---|---|---|---|---|---|
| Silicone oil | Oil | 3 | 5 | 10 | 3 | 3 | 3 |  |  |  | 3 |
| N-phenyl-N'-isopropyl-p-phenylenediamine | Antiozonant | 15 | 15 | 15 | 10 | 30 |  |  |  | 30 |  |
| N-(1,3-dimethylbutyl)-N'-phenyl-1,4-phenylenediamine | Antiozonant |  |  |  |  |  | 15 |  |  |  |  |
| Toluene | Solvent | 82 | 80 | 75 | 87 | 67 | 82 |  |  |  | 97 |
| Silicone emulsion (water-soluble) |  |  |  |  |  |  |  |  | 100 | 70 |  |
| Total (% by weight) |  | 100 | 100 | 100 | 100 | 100 | 100 | — | 100 | 100 | 100 |
| Result |  |  |  |  |  |  |  |  |  |  |  |
| Stickiness test |  | o | o | o | o | o | o | x | o | x | o |
| Ozone deterioration test | JIS D 0205(1976) | o | o | o | o | o | o | x | x | o | x |
|  | ISO 1431-1A(2012) | — | — | — | — | o | — | — | — | — | — |
| Rust-proof test |  | o | o | o | o | o | o | o | x | o | o | mately 860 g) from above. Thereafter, the samples were inserted in a push-pull gauge (produced by Ooba Keiki Seisakusho) as shown in FIG. 4, and a pushing force was laterally applied. Then, for all of the twenty samples, a release force (gf) with which one test sample could be taken out was measured, and the stickiness was evaluated according to the following evaluation criteria. The result is shown in Table 1.

Evaluation Criteria:

o: less than five test samples showed a release force of 80 gf or more.

The result of the stickiness test shown in Table 1 reveals that the seal members obtained in Examples 1 to 6 all are low in release force, and the seal members are not likely to stick to each other.

Further, the result of the ozone deterioration test reveals that the seal members obtained in Examples 1 to 6 all sufficiently exhibit the function of the antiozonant because no crack is observed. Regarding Example 5, no crack is observed even after exposure to ozone for 48 hours, indicating that excellent ozone deterioration preventive function is exhibited.

In addition, the result of the rust-proof test reveals that the seal members obtained in Examples 1 to 6 are all evaluated as ○ and thus are excellent in rust-proof properties.

In the rust-proof test, the seal members obtained in Examples 1 to 6 maintained the adhesivity with an SPCC steel sheet even after the test, revealing that the seal members have excellent adhesivity with a core metal and maintain the heat resistance.

On the other hand, regarding the seal body of Comparative Example 1, it was easy for seal members to stick to each other, cracks were observed in the ozone deterioration test, and evaluation of the rust-proof properties was poor.

In the sealing member of Comparative Example 2, the stickiness was ameliorated compared with that of Comparative Example 1, whereas the rust-proof property worsened.

Regarding the seal member of Comparative Example 3, it was easy for seal members to stick to each other.

Regarding the seal member of Comparative Example 4, the function of the antiozonant was not sufficiently exhibited.

DESCRIPTION OF THE REFERENCE CHARACTERS 1 rolling bearing
2 inner ring
3 outer ring
4 retainer
5 rolling element
6 inner ring circumferential groove
7 outer ring circumferential groove
10 grease
11 seal member
12 core metal
13 elastic body
14 main lip
15 dust lip
15A groove
16 outer diameter lip
A annular opening
17A, 17B seal for rolling bearing
18 slinger
18A sleeve
18B flange
19 core metal
19A core metal cylinder
19B core metal flange
20 seal member
20A base portion
20B, 200, 20D seal lip portion
20E outer peripheral seal part
21 bearing device
22 inner ring (radially inner member)
22A raceway surface
23 outer ring (radially outer member)
23A raceway surface
24 ball (rolling element)
C, D fitting part between metals

The invention claimed is:

1. A seal member for a rolling bearing, the seal member comprising:
   a seal body; and
   a coating layer that contains an antiozonant and silicone oil, and is formed on a surface of the seal body,
   wherein the coating layer is comprised of a predetermined ratio of the antiozonant and the silicone oil, and
   wherein in the coating layer, a content of the antiozonant is 50 to 92% by weight and a content of the silicone oil is 8 to 50% by weight.

2. The seal member for a rolling bearing according to claim 1, wherein the seal body contains a dienic rubber composition.

3. The seal member for a rolling bearing according to claim 1, wherein the coating layer is a liquid having predetermined viscosity.

4. A method for producing a seal member for a rolling bearing, wherein the seal member comprises a seal body; and a coating layer that contains an antiozonant and silicone oil, and is formed on a surface of the seal body, wherein the coating layer is comprised of a predetermined ratio of the antiozonant and the silicone oil, and wherein in the coating layer, a content of the antiozonant is 50 to 92% by weight and a content of the silicone oil is 8 to 50% by weight,
   the method, comprising:
   a step of applying, to the surface of the seal body, a coating composition containing 10 to 30% by weight of the antiozonant and 3 to 10% by weight of the silicone oil, the antiozonant and the silicone oil being dispersed in a solvent.

5. The method for producing a seal member for rolling bearing according to claim 4, the method further comprising:
   a step of vaporizing the solvent in the coating composition to form the coating layer.

6. The method for producing a seal member for rolling bearing according to claim 4, wherein
   the seal body includes a dienic rubber composition.

* * * * *